US012453986B2

(12) United States Patent
Toya et al.

(10) Patent No.: US 12,453,986 B2
(45) Date of Patent: Oct. 28, 2025

(54) METHOD OF COATING STRIPPABLE COATING MATERIAL

(71) Applicant: TOYOTA JIDOSHA KABUSHIKI KAISHA, Toyota (JP)

(72) Inventors: Nozomi Toya, Toyota (JP); Junya Ogawa, Okazaki (JP); Kenji Yamaguchi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/653,024

(22) Filed: May 2, 2024

(65) Prior Publication Data

US 2024/0399413 A1 Dec. 5, 2024

(30) Foreign Application Priority Data

May 30, 2023 (JP) ................................ 2023-088368

(51) Int. Cl.
*B05D 5/08* (2006.01)
*B05D 3/12* (2006.01)
*B05D 7/00* (2006.01)
*B05D 7/02* (2006.01)
*B05D 7/14* (2006.01)

(52) U.S. Cl.
CPC ................ *B05D 5/08* (2013.01); *B05D 3/12* (2013.01); *B05D 7/02* (2013.01); *B05D 7/14* (2013.01); *B05D 7/57* (2013.01)

(58) Field of Classification Search
CPC . B05D 3/002; B05D 3/12; B05D 5/08; B05D 7/02; B05D 7/14; B05D 7/57; B05D 2350/38
USPC .... 427/154, 155, 156, 290, 322, 327, 407.1, 427/409, 412.1, 412.3
See application file for complete search history.

(56) References Cited

U.S. PATENT DOCUMENTS 3,706,589 A * 12/1972 Fukuda .................. C09D 5/008 428/323
5,186,978 A * 2/1993 Woodhall ................ B08B 17/04 524/379

(Continued)

FOREIGN PATENT DOCUMENTS

GB 968285 A * 9/1964
JP 2004314025 A 11/2004

OTHER PUBLICATIONS

"Grit = Micron = Mesh Conversion Chart" (https://www.cousin.uk/PDF/categories/8656_Gritconversion.pdf) retrieved Aug. 25, 2025. (Year: 2025).*

*Primary Examiner* — William P Fletcher, III
(74) *Attorney, Agent, or Firm* — Dickinson Wright, PLLC

(57) ABSTRACT

Provided is a method of coating a strippable coating material capable of achieving uniform adhesion between a painted surface and a strippable coating composed of the strippable coating material. The method of coating the strippable coating material includes steps of: typical vehicle coating to form an electrodeposition layer, an intermediate coating layer, a base layer, and a clear layer on a coated object; polishing the painted surface of the coated object using an abrasive so as to form uniform irregularities on the painted surface; degreasing to perform a degreasing treatment on the polished painted surface; and coating the strippable coating material on the polished painted surface.

3 Claims, 7 Drawing Sheets

(56) References Cited

U.S. PATENT DOCUMENTS

| | | | | | |
|---|---|---|---|---|---|
| 5,302,413 | A * | 4/1994 | Woodhall | C09D 5/008 | 524/379 |
| 5,362,786 | A * | 11/1994 | Woodhall | B08B 17/04 | 524/379 |
| 5,411,760 | A * | 5/1995 | Woodhall | B05D 1/325 | 427/259 |
| 5,523,117 | A * | 6/1996 | Woodhall | C09D 5/008 | 524/379 |
| 5,603,992 | A * | 2/1997 | Woodhall | C09D 101/00 | 427/544 |
| 5,739,191 | A * | 4/1998 | Woodhall | C09D 5/008 | 427/154 |
| 5,750,190 | A * | 5/1998 | Woodhall | B05D 1/325 | 524/379 |
| 5,866,199 | A * | 2/1999 | Swidler | B05D 1/325 | 427/407.1 |
| 6,124,044 | A * | 9/2000 | Swidler | B65B 33/00 | 427/155 |
| 7,252,853 | B2 * | 8/2007 | Woodhall | B08B 17/04 | 427/259 |
| 8,263,231 | B2 * | 9/2012 | Mesa | C09D 5/20 | 524/427 |
| 9,181,438 | B2 * | 11/2015 | Woodhall | B05D 7/02 | |
| 10,059,847 | B2 * | 8/2018 | Woodhall | B05B 16/40 | |
| 10,174,209 | B2 * | 1/2019 | Woodhall | B65D 85/00 | |
| 2007/0207269 | A1 * | 9/2007 | Woodhall | B05D 1/02 | 427/282 |
| 2012/0148747 | A1 * | 6/2012 | Woodhall | C09D 5/20 | 427/259 |
| 2013/0011563 | A1 * | 1/2013 | Lizotte | B05D 7/08 | 427/407.1 |
| 2015/0259544 | A1 * | 9/2015 | Lee | C09D 5/20 | 523/122 |
| 2023/0098435 | A1 * | 3/2023 | Yamamoto | C23C 24/08 | 427/282 |

* cited by examiner

METHOD OF COATING STRIPPABLE COATING MATERIAL

CROSS REFERENCE TO RELATED APPLICATIONS

The present application claims priority from Japanese patent application JP 2023-088368 filed on May 30, 2023, the entire content of which is hereby incorporated by reference into this application.

BACKGROUND

Technical Field

The present disclosure relates to a method of coating a strippable coating material.

Background Art

Conventionally, an example in such a technical field is described in JP2004-314025 A. JP2004-314025 A discloses a coating method in which an undercoat layer composed of an easily strippable coating material is provided between a coated object and a highly durable coating material, and a coated layer composed of the easily strippable coating material and the highly durable coating material is easily peeled and removed, as necessary, by utilizing the peelable function of the undercoat layer so as to facilitate recoating.

SUMMARY

However, in a strippable coating formed by coating an easily strippable coating material on a painted surface of a coated object, the adhesion with the painted surface varies depending on the base, and thus, the adhesion between the painted surface and the strippable coating tends to be uneven. When the adhesion is uneven, some portions are excessively easy or difficult to be peeled, causing a problem that the strippable coating cannot be easily peeled.

The present disclosure has been made in view of such a technical problem, and provides a method of coating a strippable coating material achieving uniform adhesion between the painted surface and the strippable coating composed of the strippable coating material.

A method of coating a strippable coating material according to the present disclosure includes steps of polishing a painted surface of a coated object using an abrasive so as to form uniform irregularities on the painted surface and coating the strippable coating material on the painted surface that is polished.

In the method of coating the strippable coating material according to the present disclosure, prior to coating the strippable coating material, the painted surface of the coated object is polished using an abrasive so as to form uniform irregularities on the painted surface so that uniform irregularities can be formed on the painted surface. Further, when the polished painted surface is coated with the strippable coating material, the irregularities formed on the painted surface exhibit the anchoring effect, thereby making it possible to secure the adhesion between the painted surface and the strippable coating composed of the strippable coating material. In addition, since the irregularities are uniform, the adhesion between the painted surface and the strippable coating can be made uniform. Further, even when the painted surface of the coated object has uneven irregularities, the irregularities can be made uniform by polishing, so that the adhesion between the painted surface and the strippable coating can be kept uniform.

In the method of coating a strippable coating material according to the present disclosure, in some embodiments, in the polishing, the painted surface is polished using a polisher supplied with an abrasive or the painted surface is wiped up using a cloth member supplied with a fine particle abrasive. The polishing method using the polisher supplied with the abrasive is suitable for, for example, polishing a painted surface having relatively rough irregularities (e.g., the painted surface of a used vehicle). Meanwhile, the polishing method using the cloth member supplied with the fine particle abrasive is suitable for, for example, forming uniform irregularities on a smooth painted surface (for example, the painted surface of a new vehicle) without irregularities. In this manner, by selectively using or concurrently using these polishing methods in accordance with the condition of the irregularities of the painted surface, it is possible to easily form uniform irregularities on the painted surface.

In the method of coating a strippable coating material according to the present disclosure, in some embodiments, the coated object is a metal panel, and prior to the polishing, an electrodeposition process, an intermediate-coating process, a base-coating process, and a clear-coating process are performed on the coated object. In this manner, it is possible to improve the adhesion between the painted surface and the strippable coating as well as to enhance the rust prevention property of the coated object.

Further, in the method of coating a strippable coating material according to the present disclosure, in some embodiments, the coated object is a resin component, and prior to the polishing, a primer-coating process, a base-coating process, and a clear-coating process are performed on the coated object. In this manner, the adhesion between the painted surface and the strippable coating can be improved.

According to the present disclosure, the adhesion between the painted surface and the strippable coating composed of the strippable coating material can be made uniform.

DETAILED DESCRIPTION

Hereinafter, an embodiment of a method of coating a strippable coating material according to the present disclosure will be described with reference to the drawings.

The method of coating the strippable coating material according to the present embodiment is, for example, a method applied to coating a vehicle such as a passenger car, a truck, a bus, or a railroad vehicle, and is a method of forming a strippable coating for suitably satisfying the need for repainting, changing a pattern, or the like of the vehicle. Although a passenger car is described as an example below, the coating method according to the present embodiment is not limited to the passenger car.

Figure 1:
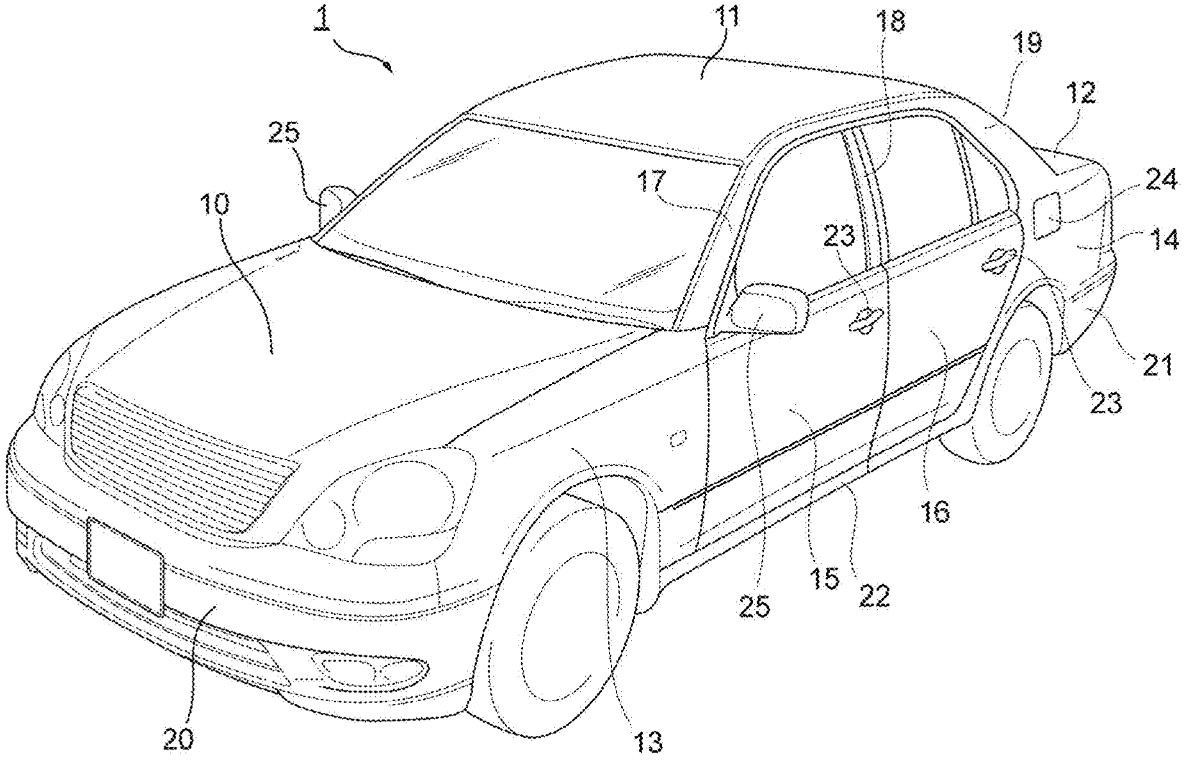
FIG. 1 is a perspective view showing a structure of a vehicle to which a method of coating a strippable coating material is applied.

FIG. 1 is a perspective view showing a structure of a vehicle (passenger car) to which a method of coating a strippable coating material is applied. As shown in FIG. 1, a vehicle 1 includes a plurality of outer panels and exterior components. The outer panels herein are externally visible members (in other words, visible from the outside of the vehicle) constituting the vehicle body. Examples of the outer panels include a hood panel 10, a roof panel 11, a trunk lid 12, a front fender panel 13, a rear fender panel 14, a front door outer 15, a rear door outer 16, a front pillar 17, a center pillar 18, and a rear pillar 19. Examples of the material of the outer panels include a metal panel, specifically, a hot-rolled steel sheet or a cold-rolled steel sheet.

Meanwhile, the exterior components of the vehicle 1 are externally visible fittings to be assembled into the vehicle body. Examples of the exterior components include a front bumper cover 20, a rear bumper cover 21, a rocker panel molding 22, a door handle 23, a fuel filler cover 24, a side-view mirror 25, a shark fin (not shown), and a roof molding (not shown). The material mainly adopted for the exterior components is resin, but the fuel filler cover 24 may be formed of sheet steel.

A strippable coating 30 is formed on each of the aforementioned outer panels and exterior components. More specifically, at least the outer surface of the outer panel and at least the outer surface of the exterior component are each provided with the strippable coating 30 formed by coating the strippable coating material (the easily strippable coating material). In some embodiments, in addition to the outer surface, a side end surface of the outer panel and a side end surface of the exterior component are also each provided with the strippable coating 30 formed by coating the strippable coating material. In addition to the outer surface and the side end surface, a portion of a back surface of the outer panel and a portion of a back surface of the exterior component may be each provided with the strippable coating 30 formed by coating the strippable coating material.

In the present embodiment, the outer panel and the exterior component of a vehicle correspond to a "coated object" described in the claims.

Figure 2:
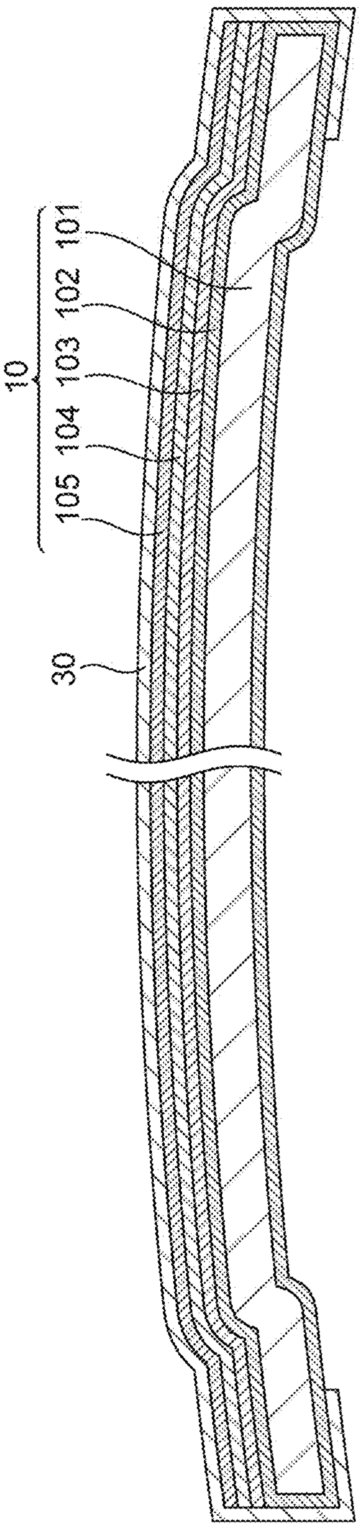
FIG. 2 is a schematic cross-sectional view showing a hood panel and a strippable coating formed on the hood panel.

Hereinafter, as shown in FIG. 2, the strippable coating 30 formed on the outer panel will be described. Here, an example of the hood panel 10 will be described as the outer panel.

FIG. 2 is a schematic cross-sectional view showing the hood panel and the strippable coating formed on the hood panel. In FIG. 2, the upper side with respect to the paper surface is a front side (also referred to as an outer side) of the hood panel 10 and the lower side is a back side (also referred to as an inner side) of the hood panel 10. As shown in FIG. 2, the hood panel 10 includes a steel plate 101, an electrodeposited layer 102 formed so as to cover the entire steel plate 101, and an intermediate coating layer 103, a base layer 104 and a clear layer 105 sequentially formed on the electrodeposited layer 102 on the front side of the hood panel 10. The base layer 104 and the clear layer 105 constitute overcoat layers. Note that in the present embodiment, "layer" and "coating" have the same meaning. Thus, for example, "electrodeposited layer" is synonymous with "electrodeposited coating."

The strippable coating 30 is formed on the entire outer surface and side end surface and a portion of the back surface of the hood panel 10. Specifically, the strippable coating 30 is formed so as to cover the entire outer surface of the clear layer 105, the side end surfaces of the electrodeposited layer 102, the intermediate coating layer 103, the base layer 104 and the clear layer 105, and a portion of the back surface of the electrodeposited layer 102. The strippable coating 30 is formed by coating the strippable coating material as described above, and thus has a property of being easily peeled off as compared to a typical coating composed of the electrodeposited layer 102, the intermediate coating layer 103, the base layer 104, and the clear layer 105.

Note that the base layer and the clear layer or only the clear layer may be further formed on an outer side of the strippable coating 30. By forming the clear layer, the weather resistance and the chemical resistance of the strippable coating 30 can be enhanced, and the gloss feeling and the high-grade feeling can be further enhanced. Further, by forming the base layer, variations in color can be increased.

Figure 3:
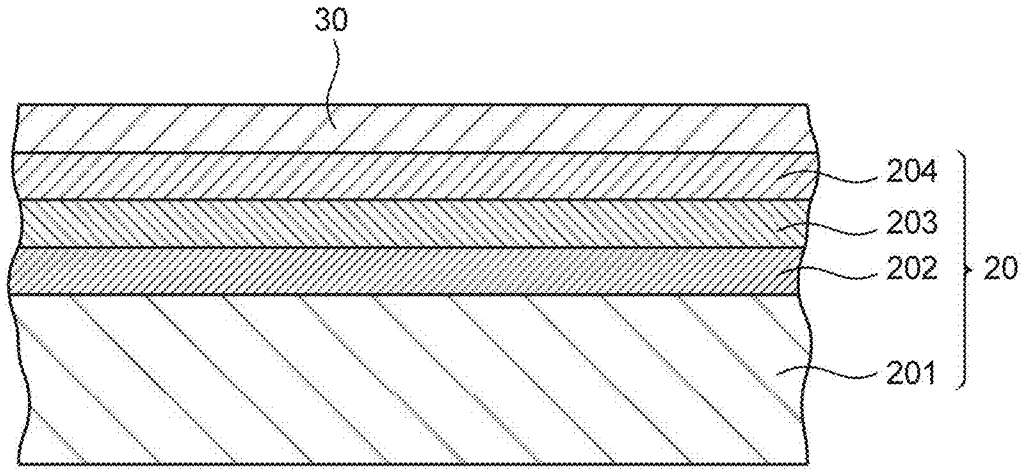
FIG. 3 is a schematic cross-sectional view showing a front bumper cover and the strippable coating formed on the front bumper cover.

Next, as shown in FIG. 3, the strippable coating 30 formed on an exterior component will be described. Here, an example of the front bumper cover 20 will be described as the exterior component.

FIG. 3 is a schematic cross-sectional view showing the front bumper cover and the strippable coating formed on the front bumper cover. In FIG. 3, the upper side with respect to the paper surface is a front side (also referred to as an outer side) of the front bumper cover 20 and the lower side is a back side (also referred to as an inner side) of the front bumper cover 20. The front bumper cover 20 includes a resin member 201 integrally molded in the form of a bumper, and a primer layer 202, a base layer 203 and a clear layer 204 sequentially formed on the resin member 201.

The strippable coating 30 is formed on the entire outer surface and side end surface and a portion of the back surface of the front bumper cover 20. Specifically, the strippable coating 30 is formed so as to cover the entire outer surface of the clear layer 204. The strippable coating 30 is formed by coating the strippable coating material as described above, and thus has a property of being easily peeled off as compared to a typical coating composed of the primer layer 202, the base layer 203, and the clear layer 204. Note that the clear layer may be further formed on the outer side of the strippable coating 30.

Figure 4:
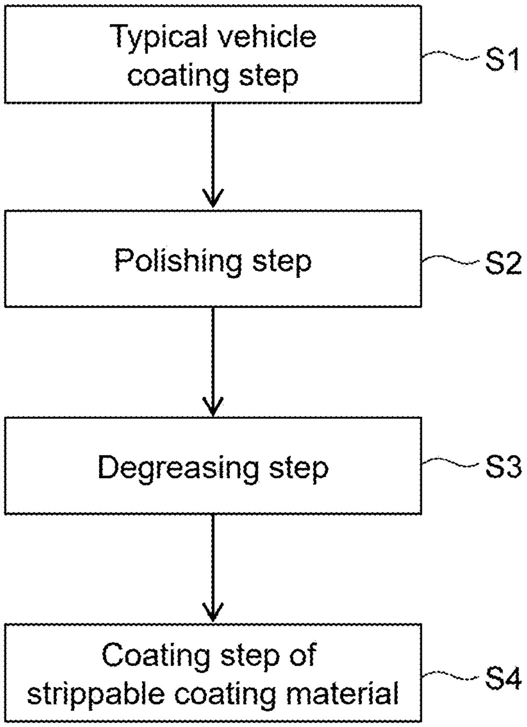
FIG. 4 is a flowchart showing the method of coating the strippable coating material according to an embodiment.

Hereinafter, as shown in FIG. 4, the method of coating the strippable coating material according to the present embodiment will be described. As shown in FIG. 4, the method of coating the strippable coating material mainly includes a typical vehicle coating step S1, a polishing step S2, a degreasing step S3, and a coating step S4 of the strippable coating material.

When the coated object is a metal outer panel, in the typical vehicle coating step S1, an electrodeposited layer, an intermediate coating layer, a base layer and a clear layer are sequentially formed on the outer panel by performing an electrodeposition process, an intermediate-coating process, a base-coating process, and a clear-coating process on the outer panel. For example, when the coated object is the hood panel 10, as shown in FIG. 2 above, coating is performed to sequentially form the electrodeposited layer 102, the intermediate coating layer 103, the base layer 104 and the clear layer 105 on a front side of the steel sheet 101 of the hood panel 10.

Meanwhile, when the coated object is a resin exterior component, in the typical vehicle coating step S1, a primer layer, a base layer and a clear layer are sequentially formed on the exterior component by performing a primer-coating process, a base-coating process, and a clear-coating process on the exterior component. For example, when the coated object is the front bumper cover 20, as shown in FIG. 3 above, coating is performed to sequentially form the primer layer 202, the base layer 203 and the clear layer 204 on a front side of the resin member 201 of the front bumper cover 20.

In the polishing step S2 subsequent to the typical vehicle coating step S1, a painted surface of the coated object is polished using an abrasive so as to form uniform irregularities on the painted surface. When the coated object is the hood panel 10, the electrodeposited layer 102, the intermediate coating layer 103, the base layer 104 and the clear layer 105 are formed on the hood panel 10, and thus an outer surface of the clear layer 105 becomes the painted surface of the hood panel 10. Meanwhile, when the coated object is the front bumper cover 20, the primer layer 202, the base layer 203 and the clear layer 204 are formed on the front bumper cover 20, and thus an outer surface of the clear layer 204 becomes the painted surface of the front bumper cover 20.

In the polishing step S2, a polisher supplied with an abrasive is used to polish the painted surface, or a cloth member supplied with a fine particle abrasive is used to wipe up the painted surface. For example, in polishing the painted surface of the hood panel 10 or the painted surface of the front bumper cover 20, the polisher supplied with the abrasive may be used, the cloth member supplied with the fine particle abrasive may be used, or a combination thereof may be used.

The polisher is, for example, a polisher or a sander equipped with a sponge buff. In this case, after the abrasive is applied to the sponge buff, the sponge buff is pressed against the painted surface of the hood panel 10 (more specifically, the outer surface of the clear layer 105) or the painted surface of the front bumper cover 20 (more specifically, the outer surface of the clear layer 204) to perform buffing while rotating the polisher or the sander at a high speed, thereby forming uniform irregularities on the outer surface of the clear layer 105 or the outer surface of the clear layer 204.

After buffing, the polished painted surface is wiped up with fabric such as a cloth. Such an operation is repeated as necessary. Note that the particle size of the abrasive used herein may be, for example, 0.2 μm to 50 μm.

Meanwhile, the cloth member is, for example, waste cloth used for wiping oil. The waste cloth may be a microfiber cloth. In this case, after base polish (fine particle abrasive) is applied to the wet waste cloth, the painted surface of the hood panel 10 (more specifically, the outer surface of the clear layer 105) or the painted surface of the front bumper cover 20 (more specifically, the outer surface of the clear layer 204) is wiped up. Thereafter, the excess base polish remaining on the painted surface is wiped off with a dry cloth. Such an operation is repeated as necessary. Note that the particle size of the fine particle abrasive used herein may be, for example, 0.1 μm to 1.5 μm.

In the degreasing step S3 subsequent to the polishing step S2, a degreasing treatment is performed on the polished painted surface. The degreasing treatment may be, for example, a commonly used solvent degreasing. Note that the degreasing step is not necessarily required, and the coating step of the strippable coating material may be immediately performed after the polishing step.

In the coating step S4 of the strippable coating material subsequent to the degreasing step S3, the polished painted surface is coated with the strippable coating material to form the strippable coating 30. For example, the painted surface of the hood panel 10 (more specifically, the outer surface of the clear layer 105) or the painted surface of the front bumper cover 20 (more specifically, the outer surface of the clear layer 204) is coated with the strippable coating material by spraying to form the strippable coating 30 described above.

The strippable coating material is a coating material having a property of easily peeling off the formed coating as compared to the coating material used for the typical vehicle coating. The strippable coating material is not particularly limited, and a solvent containing a resin component or a water-based coating material is used. Examples of the resin component include known resins such as acrylic resins, polyester resins, alkyd resins, epoxy resins, and polyurethane resins.

The strippable coating material may also contain pigment components. The pigment is not particularly limited, and examples thereof include typical coloring pigments and metallic pigments. Examples of the coloring pigments include titanium dioxide, zinc oxide, basic lead sulfate, calcium plumbate, zinc phosphate, aluminum phosphate, zinc molybdate, calcium molybdate, iron blue, ultramarine blue, cobalt blue, copper phthalocyanine blue, indanthrone blue, chrome yellow, synthetic yellow iron oxide, clear colcothar (yellow), bismuth vanadate, titanium yellow, zinc yellow, strontium chromate, lead cyanamide, monoazo yellow, disazo, isoindolinone yellow, metal complex azo yellow, quinophthalone yellow, isoindoline yellow, benzimidazolone yellow, colcothar, clear colcothar (red), minium, monoazo red, unsubstituted quinacridone red, azolake (Mn salt), quinacridone magenta, anthanthrone orange, dianthraquinonyl red, perylene maroon, perylene red, diketopyrrolopyrrole chrome vermilion, basic lead chromate, chromium oxide, chlorinated phthalocyanine green, brominated phthalocyanine green, pyrazolone orange, benzimidazolone orange, dioxazine violet, and perylene violet. Examples of the metallic pigment include aluminum powder, flaky aluminum oxide, pearl mica, and flaky mica. Of these pigments, one alone or two or more types of those in combination may be used.

In the method of coating the strippable coating material according to the present embodiment, the polishing step S2 is performed after the typical vehicle coating step S1 to form uniform irregularities on the painted surface of the vehicle, so that when the painted surface is coated with the strippable coating material in the subsequent coating step S4 of the strippable coating material, the irregularities formed on the painted surface exhibit the anchoring effect, thereby making it possible to secure the adhesion between the painted surface and the strippable coating 30 composed of the strippable coating material. In addition, since the irregularities are uniform, the adhesion between the painted surface and the strippable coating 30 can be made uniform.

Figure 5:
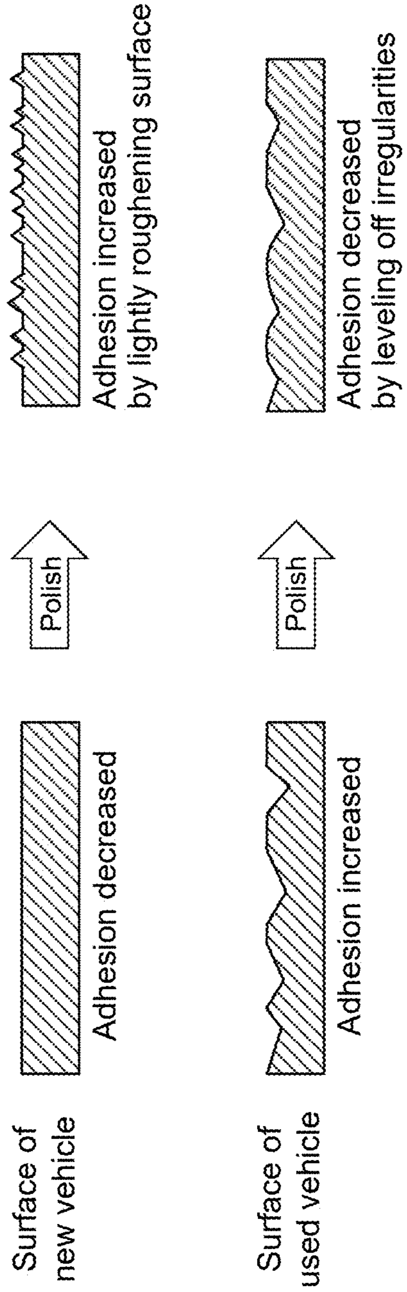
FIG. 5 is a schematic diagram for explaining the effect of the method of coating the strippable coating material.

As shown on the upper side of FIG. 5, for example, a vehicle (herein, referred to as a new vehicle) painted in the typical vehicle coating step S1 has a smooth surface (i.e., the painted surface) without irregularities. When the strippable coating material is directly coated on the smooth painted surface, there is a possibility that the adhesion between the painted surface and the strippable coating 30 formed on the painted surface is low and a predetermined adhesion cannot be secured. Further, when the irregularities are formed by lightly roughening the smooth painted surface by polishing, the irregularities exhibit the anchoring effect, thereby enabling the adhesion between the painted surface and the strippable coating 30 to be increased. Moreover, by forming uniform irregularities on the painted surface by polishing, the adhesion between the painted surface and the strippable coating 30 can be kept uniform.

In addition, as shown on the lower side of FIG. 5, for a vehicle (herein, referred to as a used vehicle) that is painted in the typical vehicle coating step S1 and used for a certain period of time, irregularities are formed on the outer surface (i.e., the painted surface) of the vehicle due to use, and the irregularities are uneven. Although the anchoring effect is enhanced due to uneven irregularities, thereby enabling the adhesion between the painted surface and the strippable coating 30 to be increased, the strippable coating 30 could be difficult to be peeled off. Therefore, in the case of the used vehicle, the adhesion between the painted surface and the strippable coating 30 is decreased by leveling off the irregularities by polishing prior to the coating of the strippable coating material. In this manner, even when the painted surface of the coated object has uneven irregularities, the adhesion between the painted surface and the strippable coating can be made uniform by polishing the painted surface so as to form uniform irregularities.

Further, in the polishing step S2, a polisher supplied with an abrasive is used to polish the painted surface, or a cloth member supplied with a fine particle abrasive is used to wipe up the painted surface. The polishing method using the polisher supplied with the abrasive is suitable for, for example, polishing a painted surface having relatively rough irregularities (e.g., the painted surface of the used vehicle). Meanwhile, the polishing method using the cloth member supplied with the fine particle abrasive is suitable for, for example, forming uniform irregularities on a smooth painted surface (for example, the painted surface of the new vehicle) without irregularities. In this manner, by selectively using or concurrently using these polishing methods based on the condition of the irregularities of the painted surface, it is possible to easily form uniform irregularities on the painted surface.

Further, since the degreasing step S3 is further included between the polishing step S2 and the coating step S4 of the strippable coating material, even when the abrasive remains in the polishing step S2, the remaining abrasive as well as the oil and grease content adhering to the painted surface can be removed. It is possible to suppress the residual oil and grease content or abrasive affecting the coating.

Further, prior to the polishing step S2, by performing the typical vehicle coating including the electrodeposition process, the intermediate-coating process, and the overcoating process on a metal coated object, it is possible to improve the adhesion between the painted surface and the strippable coating 30 as well as to enhance the rust prevention property of the coated object.

Example and Comparative Example

The inventors of the present disclosure conducted the following Example and Comparative example in order to verify the effect of the method of coating the strippable coating material according to the present embodiment.

First, the inventors of the present disclosure produced a plurality of samples (i.e., the outer panels coated in the aforementioned typical vehicle coating step S1) obtained by applying the typical vehicle coating to a hot-rolled steel sheet used as the outer panel of the vehicle, and a new sample (hereinafter, referred to as an "initial product"), the new sample with the coating scratched (hereinafter, referred to as a "scratched product"), and the new sample subjected to weathering for one week to be deteriorated (ultraviolet irradiation) (hereinafter, referred to as a "product deteriorated due to weathering") were set as one group, and three of such groups were prepared.

Comparative Example 1

Next, for one of the above three groups, without polishing the coating surface (the painted surface) formed by the typical vehicle coating, the strippable coating material was coated on the painted surface as described in the coating step S4 of the strippable coating material to form the strippable coating. In other words, the strippable coating was formed by directly coating the strippable coating material on the painted surface of each of the initial product, the scratched product, and the product deteriorated due to weathering of this group.

Example 1

Further, for one of the above three groups, the coating surface (the painted surface) formed by the typical vehicle coating was polished using a cloth member supplied with a fine particle abrasive, and then the strippable coating material was coated on the painted surface as described in the coating step S4 of the strippable coating material to form the strippable coating. In other words, the painted surface of each of the initial product, the scratched product, and the product deteriorated due to weathering of this group was polished using the cloth member supplied with the fine particle abrasive, and then the strippable coating material was coated on each of the polished painted surfaces to form the strippable coating.

Example 2

Further, for one of the above three groups, the coating surface (the painted surface) formed by the typical vehicle coating was polished using a polisher supplied with an abrasive and was then coated with the strippable coating material as described in the coating step S4 of the strippable coating material to form the strippable coating. In other words, the painted surface of each of the initial product, the scratched product, and the product deteriorated due to weathering of this group was polished using the polisher supplied with the abrasive, and then the strippable coating material was coated on each of the polished painted surfaces to form the strippable coating.

Next, the adhesion between the painted surface and the strippable coating of each sample of the above three groups was measured and compared. For the adhesion measurement, a 180° peel test in accordance with JIS Z 0237 "Testing methods of pressure-sensitive adhesive tapes and sheets" was conducted. More specifically, the strippable coating of each sample was notched by a given width (here, 10 mm) and the end thereof was held in a tensile tester, and the strength when the strippable coating was pulled and peeled was measured. The adhesion herein is also referred to as peel strength.

Figure 6:
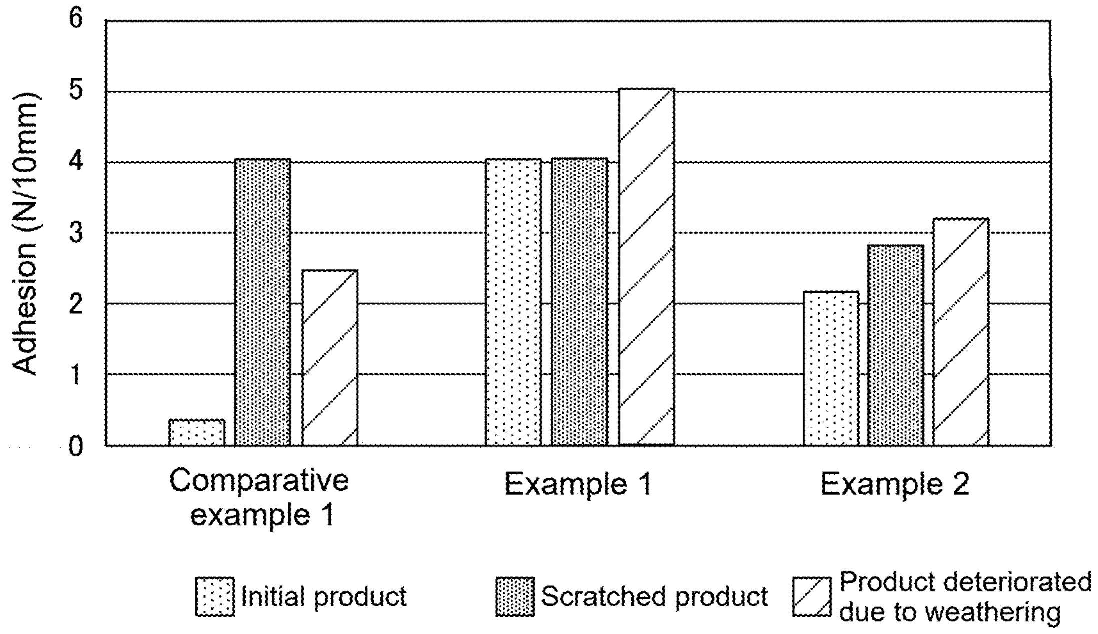
FIG. 6 shows results of Examples 1 and 2, and Comparative example 1.

FIG. 6 shows the results of Examples 1 and 2 and Comparative example 1. As shown in FIG. 6, it was found that the variations in the adhesion between the painted surface and the strippable coating in Examples 1 and 2 are fewer than Comparative example 1. That is, it was revealed that even when the condition of the painted surface of the initial product, the scratched product, and the product deteriorated due to weathering differs, uniform irregularities are obtained by polishing using the cloth member or polishing using the polisher, thereby achieving uniform adhesion between the painted surface and the strippable coating. The adhesion between the painted surface and the strippable coating is preferably 0.5N/10 mm to 15N/10 mm, more preferably 1N/10 mm to 10N/10 mm.

In addition, the inventors of the present disclosure produced a plurality of samples (i.e., the hood panels coated in the aforementioned typical vehicle coating step S1) obtained by applying the typical vehicle coating to the hood panel of the vehicle, and a new sample (hereinafter referred to as an "initial product"), the new sample exposed to the natural environment in Okinawa for a period of up to two years (hereinafter, referred to as an "Okinawa exposed product"), and the new sample subjected to an accelerated test for a period of up to ten years (hereinafter, referred to as an "accelerated test product") were set as one group, and three of such groups were prepared. Note that the accelerated test is in accordance with JIS K 5600-7-7 "Long-period performance of film: accelerated weathering."

Comparative Example 2

Next, for one of the above three groups, without polishing the coating surface (the painted surface) formed by the typical vehicle coating, the painted surface was coated with the strippable coating material as described in the coating step S4 of the strippable coating material to form the strippable coating. In other words, the strippable coating was formed by directly coating the strippable coating material on the painted surface of each of the initial product, the Okinawa exposed product, and the accelerated test product of this group.

Example 3

Further, for one of the above three groups, the coating surface (the painted surface) formed by the typical vehicle coating was polished using a cloth member supplied with a fine particle abrasive, and then the painted surface was coated with the strippable coating material as described in the coating step S4 of the strippable coating material to form the strippable coating. In other words, the painted surface of each of the initial product, the Okinawa exposed product, and the accelerated test product of this group was polished using the cloth member supplied with the fine particle abrasive, and then each of the polished painted surfaces was coated with the strippable coating material to form the strippable coating.

Example 4

Furthermore, for one of the above three groups, the coating surface (the painted surface) formed by the typical vehicle coating was polished using a polisher supplied with an abrasive and then the painted surface was coated with the strippable coating material as described in the coating step S4 of the strippable coating material to form the strippable coating. In other words, after polishing the painted surface of each of the initial product, the Okinawa exposed product, and the accelerated test product of this group using the polisher supplied with the abrasive, each of the polished painted surfaces was coated with the strippable coating material to form the strippable coating.

Next, the adhesion between the painted surface and the strippable coating of each sample of the above three groups was measured and compared in the same manner as described above.

Figure 7:
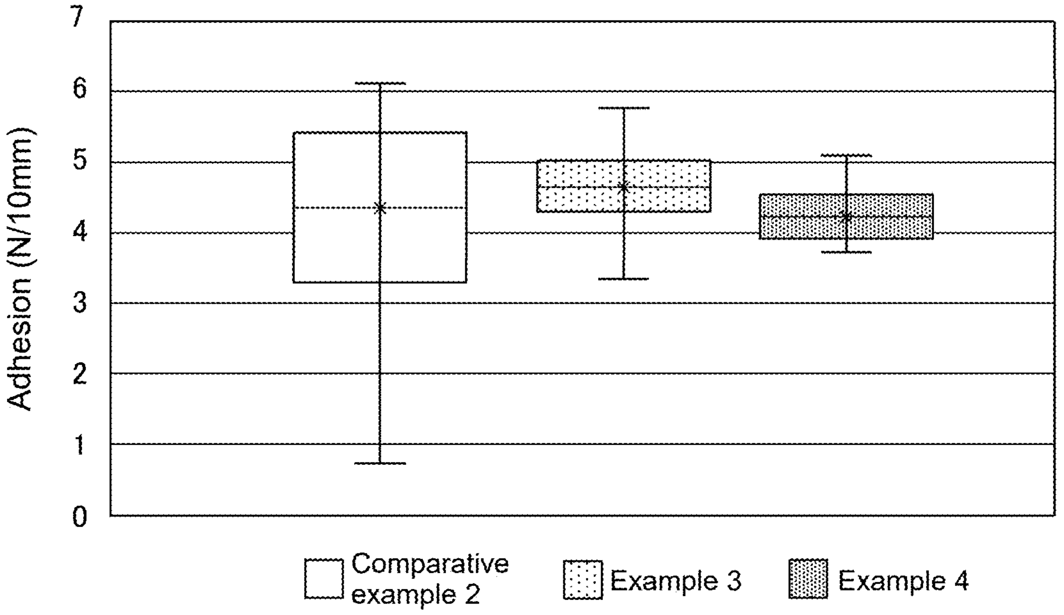
FIG. 7 shows results of Examples 3 and 4, and Comparative example 2.

FIG. 7 shows the results of Examples 3 and 4 and Comparative example 2. As shown in FIG. 7, it was found that the variations in the adhesion between the painted surface and the strippable coating in Examples 3 and 4 are fewer than Comparative example 2. That is, it was revealed that even when the condition of the painted surface of the initial product, the Okinawa exposed product, and the accelerated test product differs, uniform irregularities are obtained by polishing using the cloth member or polishing using the polisher, thereby achieving uniform adhesion between the painted surface and the strippable coating.

Although the embodiments of the present disclosure have been described in detail above, the present disclosure is not limited to the aforementioned embodiments, and various design changes can be made without departing from the spirit of the present disclosure described in the claims.

What is claimed is:

1. A method of coating a strippable coating material, comprising the steps of:

polishing a painted surface of a coated object using an abrasive so as to form a surface having a predetermined roughness on the painted surface; and coating the strippable coating material on the painted surface that is polished, wherein in the polishing, the painted surface is polished using a polisher supplied with an abrasive or the painted surface is wiped up using a cloth member supplied with a particle abrasive, and wherein a particle size of the particle abrasive is 0.1 μm to 1.5 μm.

2. The method of coating a strippable coating material according to claim 1, wherein the coated object is a metal panel, and prior to the polishing, an electrodeposition process, an intermediate-coating process, a base-coating process, and a clear-coating process are performed on the coated object.

3. The method of coating a strippable coating material according to claim 1, wherein the coated object is a resin component, and prior to the polishing, a primer-coating process, a base-coating process, and a clear-coating process are performed on the coated object.

* * * * *